Aug. 30, 1966 D. GAUBAN 3,270,145
ELECTRONIC TAPE READER
Filed Nov. 21, 1960 2 Sheets-Sheet 1

INVENTOR:
D. Gauban
BY
Homer R. Montague
ATTORNEY

Aug. 30, 1966 D. GAUBAN 3,270,145

ELECTRONIC TAPE READER

Filed Nov. 21, 1960 2 Sheets-Sheet 2

INVENTOR:

D. Gauban

BY Homer R. Montague

ATTORNEY

United States Patent Office 3,270,145
Patented August 30, 1966

3,270,145
ELECTRONIC TAPE READER

Daniel Gauban, Paris, France, assignor, by mesne assignments, to Inventions Finance Corporation, a corporation of Delaware Filed Nov. 21, 1960, Ser. No. 70,747
3 Claims. (Cl. 179—100.2)

The present invention concerns an electronic system of a record reader of varying speed, being applied to such a system using tapes, wires, film-strips, etc., as record support and which enables reproduction to be at a constant tone regardless of the frequencies recorded.

In certain applications of these systems, it can be proved that the reproduction from such devices is often troubled according to the modification of the tone due to the "wowing" effects, specially when the speed is slowed down or increased by the operator.

Heretofore, in order to avoid wowing in a tape reader one had to use a complicated apparatus constructed of special parts of great accuracy which considerably increased the cost of the unit. The system subject to the present invention is the realization of a device constructed with parts of standard mechanical elements, of a low cost, having a rigorously constant tone and with a minimum wowing, at least less than 1% (at low speed) as is normally expected for a good performance.

The system consists of an electric circuit supplying a mechanism constructed of five stages, each stage containing an amplifier; some of these amplification stages are regulated in volume or in tone for the reproduction of word signals or telegraphic signals. Some of the signals supplied by an amplifier stage, are applied successively at the inlet of another amplifier stage; others are applied directly to the head reproducer according to the position and function of the system, which permits a selected hearing of every modulation, at any speed, with a stable tone for an easy reading.

In order to obtain this result, the reader head of the mechanism feeds the pre-amplifier section of a low frequency amplifier at the output of which the signals are demodulated which makes it possible to lock or release an electronic oscillator supplying constant frequency signals always at constant tone to the speaker connected to the reader head.

The realization of the principle illustrated consists of a reception plate, to whose surface adheres an elastic long-life material having a suitable friction coefficient, the axle of this plate controlling the travel of the magnetic tape. This reception plate is contacted by a sphere fixed on to the motor axle that can turn on a pivot in connection with the surface of the plate and change its place along a diameter of this same plate. It comprises a varying travel of a sphere or of the radius of a sphere with the radius at the contact point in accordance with the inclination angle of a motor, its own speed and the speed of the plate as well. The amplifier can be with tubes, with transistors or mixed. For the choice of listening frequency, a selection switch can be used which makes it possible, if desired, for that to be of the same frequency as that of the recording.

The same result can be obtained in a somewhat different realization of a device having two cones of the same angle, each one inverted in relation to the other. One generator of each of these two cones is parallel to the other, and fastened to a movable satellite turning loosely round its movable hub, said hub being movable and controlled by regulator means. In other words the satellite transfers its movement to the rotation of the contacted cone from the capstan travel.

Whatever realization device is chosen, its function as stated, will be to eliminate the risks of "wowing" during the reproduction of signals recorded, of word signals or of telegraphic messages and to control said reproduction by varying, at will, the speed, whatever may be the speed of the tape travel imposed on the band, to correct it and to restore it to constant tone, whatever may be the conditions under which the messages were sent and the disturbances of deciphering at the receiving point, and to hear words one cannot possibly catch at a normal speed.

A further object of the present system is that it can profitably be employed in various modulations either for lengthening or shortening, whatever the case may be, such as:

(1) Analysis with oscillograph of the phenomenon registered, whereby the great speed variation of the apparatus makes it possible to slow down the recorded tapes and makes the observation of the short signals or impulses, etc., easy.

(2) Minuting of a programme where it is necessary to gain time, during the composing of a broadcasting programme, on a text without leaving anything out; a slight acceleration of the travel will permit to gain that time, or to do the opposite according to conditions.

(3) The same for an accelerated examination of a recorded tape accelerated research of a recording, when the programme acceleration of the travel makes it possible to find again a part of a text or a word, or to do the opposite, slowing down the tape to find the part to be cut.

The above and other objects and advantages of the invention will become more fully apparent from the claims and from the following detailed description in conjunction with the appended drawings in which:

Figures 1, 3, 4, 5:
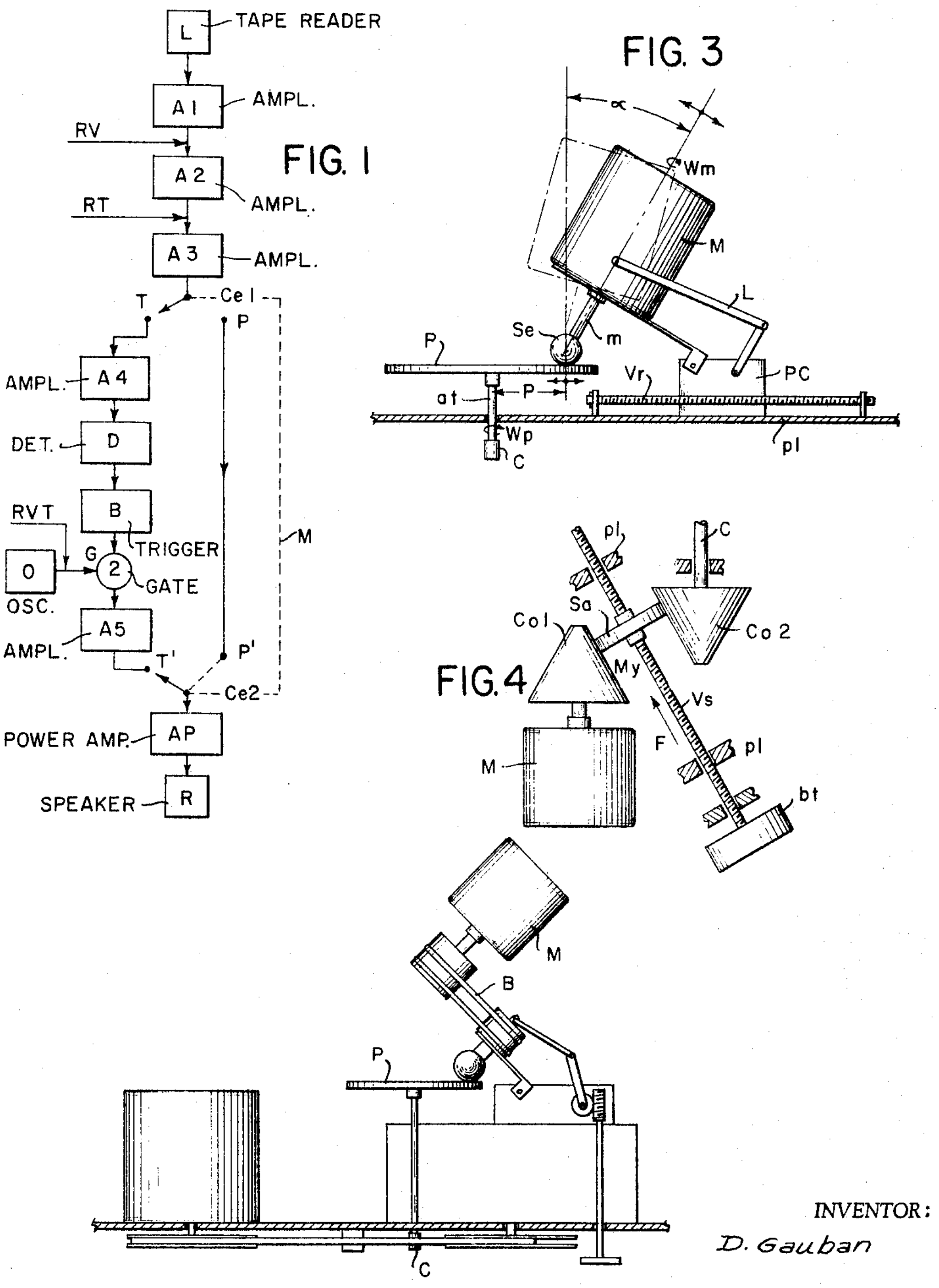
FIGURE 1 is a schematic diagram of the different stages of the circuit.

FIGURE 3 gives a schematic view illustrating one form of the invention of a mechanism of progressively variable speed.

FIGURE 4 is a schematic view illustrating another form of the invention of the mechanism of progressively variable speed.

FIGURE 5 is a view similar to FIGURE 3 showing an alternative form of drive using belts.

Referring first to FIGURE 1 of the drawings, it represents a schematic diagram of different stages of a reproduction circuit. L represents the reader. The signals that supply are applied to a first amplifier stage A1, followed by other amplifier stages A2 and A3. The signals, applied at the inlet of the stage A2, are regulated in volume and those applied at the stage A3, are regulated in tone: those two controls are schematized by RV and RT.

The signals given by the amplifier stage, can be turned off with the help of the contactor *Ce*1, either towards the chain T–T′ comprising the stages A4, D, B, O, G, A5 (whose part will be explained later on), or towards the direct connection P–P′; said chain T–T′ is used for the reproduction of telegraphic signals, the connection P–P′ for the reproduction of word signals.

The contactors *Ce*1 and *Ce*2 form one piece with the same axle as the mechanical ganged connection M shows. The contactor *Ce*2 makes it possible to connect the output amplifier stage AP followed by the sound reproduction gear R (headphones or loudspeakers for instance) with the chain T–T′ or with the connection P–P′ according to the position of the working of the system. If the chain P–P′ is working, the word signals are then reproduced, regulated in volume (control RV), and in tone (control RT), from the reader L to the sound reproducer R with the help of the successive amplification stages: A1, A2, A3, AP. In the case where the chain T–T′ is working, the signals supplied by the third amplifier stage A3 are applied at the inlet of an amplifier stage A4 followed by a detector circuit D. The signals detected make a continuous signal appear of a given polarity that command the opening of the coincidental gate G with the help of the trigger circuit B.

The coincidental gate G becomes then by-passed for the low frequency signal supplied by the osscillator O and the mentioned low frequency signal is turned off towards the amplifier stage AP, and from there towards the reproduction gear R, with the help of a fifth amplifier stage A5 and of the contactor Ce2, in position T'. The telegraphic signals so reproduced can be regulated in volume, by means of the schematized control in RVT. One can then see that the sonorous signals diffused, in this case, by R do not correspond in tone to those read by the reader L; only the cadence is respected and dictated by the locking and releasing (commanded from the reader L) of the low frequency signals to constant tone supplied by the oscillator O.

Figure 2:
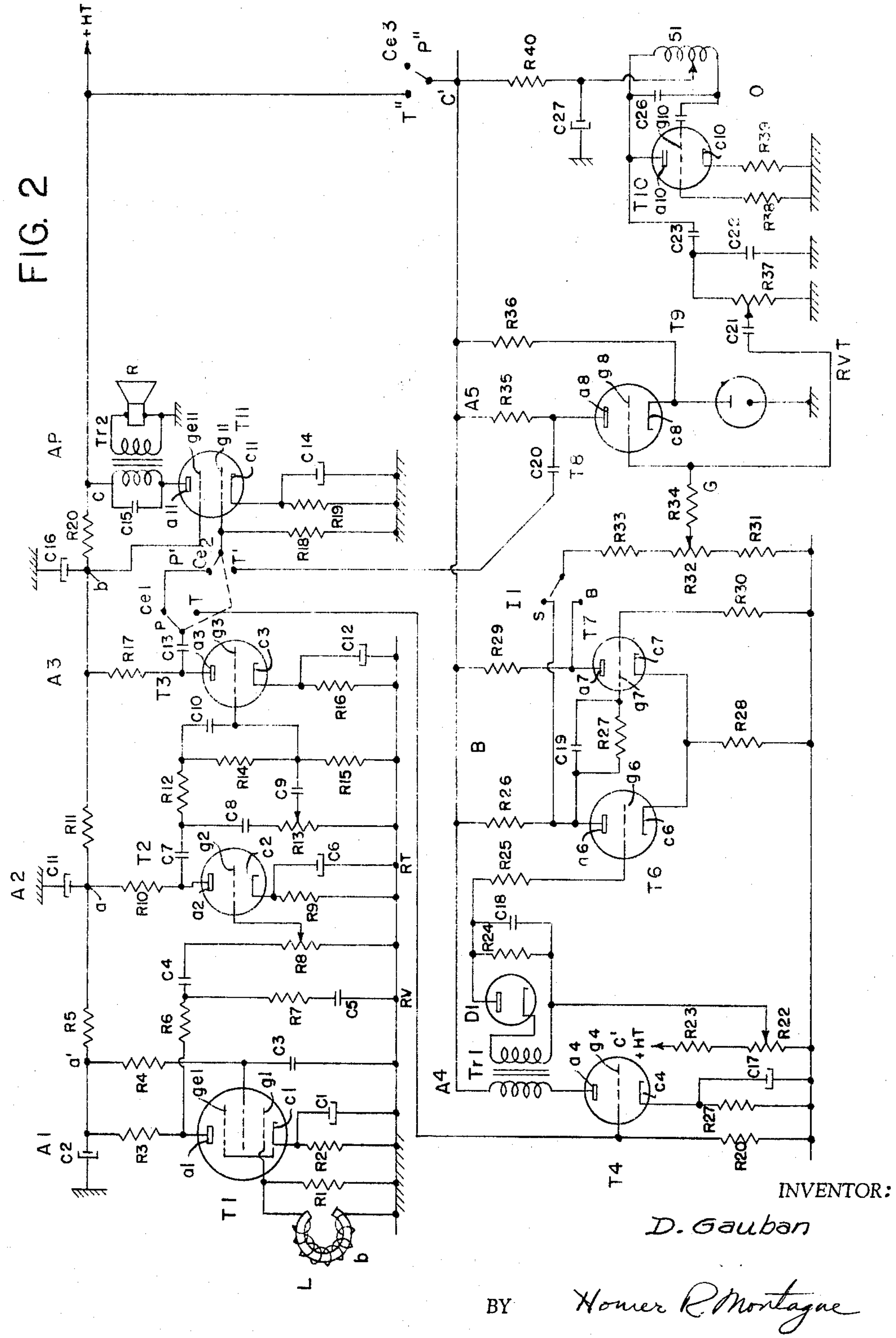
FIGURE 2 shows detailed circuits of the stages on the FIGURE 1.

FIGURE 2 represents the detailed circuits of the different stages represented on the schematic diagram, FIGURE 1.

When a record support such as a magnetic tape for instance (not represented) runs in front of the reader's head L, one collects, at the terminals of the winding *b* (FIG. 2), signals that are the electric translation of the sonorous signals that have been recorded on the magnetic tape.

The winding *b* is connected between the ground and the driving grid *g*1 of the three grid tube T1 that constitutes the amplifier stage A1. The resistance R2 and the capacitor C1, mounted in parallel between the ground and the cathode *c*1 of the tube T1, constitute the polarization circuit of that tube. The resistance R1 is the resistance of the grid leakage. The screen grid *ge*1 of the tube T1 is supplied through the resistance R4, from the point *a'* of the high tension of that tube. The condenser C3 is a decoupling condenser of the supply circuit of the screen grid. The anode of the tube T1 is supplied through the resistance R5, from the point *a* of the high tension network, the condenser C2 constituting a decoupling capacitor and the resistance R3 constituting the loading resistance of that tube.

The second amplifier stage A2 is fed, from the anode of the tube T1 by means of a voltage divider circuit constituted by the resistances R6, R7 in series with the capacitor C5, between that anode and the ground, and by means of the coupling capacitor C4 of which one end is connected to the common point of the resistances R6, R7. The function of the capacitor C5 is to block all the circulation of anodic current in the connecting circuit between the amplifier A1 and the amplifier A2.

The other end of the coupling condenser C4 is not connected directly to the driving grid *g*2 of the tube T2 that constitutes the amplifier stage A2; it is joined to one of the ends of a potentiometer R8 whose other end is earthed. This potentiometer plays the part of variable grid resistance owing to the fact that its sliding contact is connected to the driving grid *g*2 of the tube T2 which constitutes a volume regulation of the signals applied to that tube T2.

The resistance R9 and the capacitor C6, mounted in parallel between the cathode *c*2 of the tube T2 and the ground, constitute the polarization circuit of that tube. The anode *a*2 of the latter is supplied through the resistance R11 connected to the point *b* of the high tension network, the capacitor C11 being a decoupling capacitor and the resistance R10 connected between the common point *a* of R11 and C11, and the anode constituting the loading resistance of the tube.

The signals collected on the anode of the tube T2 are applied to the grid *g*3 of the tube T3 that constitutes the amplifier stage A3 by means of a connecting circuit comprising: the condenser C7, the resistance R12, and the resistance R14 and the condenser C10 in parallel by means of a circuit comprising the condenser C8 and the potentiometer R13 in series between the common point of C7, and R12 and the ground; this constitutes a path of low impedance for the high frequencies of which one part is however switched on to the driving grid *g*3 of the tube T3, by means of the capacitor C9 connected to the sliding contact of R13; the grid leakage resistance of the tube T3 is constituted by R15; the feeding circuit of the tube T3, which is just described, is a circuit of tone correction.

The cathode *c*3 of the tube T3 is connected to the ground by means of a polarization circuit comprising the resistance R16 and the capacitor C12 in parallel. The anode *a*3 of this tube is supplied from the point *b* of the high tension network, decoupled in relation to the ground, with the help of the capacitor C16, the resistance R17, connected between the anode *a*3 and the point *b* constituting the loading resistance of the tube T3. On the anode of the tube T3 is also connected the coupling capacitor C13 of which the other end is connected to a common contact of the contactor Ce1.

One could suppose that the contactors Ce1 and Ce2 are situated in the position assuring the connection P–P'. Under these conditions, the signals collected on the anode *a*3 of the tube T3 are applied on the grid of the tube T11 that constitutes the power amplifier stage AP. The resistance R18, connected between the grid *g*11 and the ground, is the grid leakage resistance of that tube. The resistance R19 and the capacitor C14, mounted in parallel between the cathode C11 of the tube T11 and the ground, constitute the cathodic polarization circuit. The tube T11 is a tetrode tube whose screen grid *ge*11 is supplied through the resistance R20, decoupled by the capacitor C16 from the point *c* of the high tension network. The loading impedance of the tube T11 is constituted by the primary winding of the transformer Tr2, connected between the anode *a*11 and the point *c* of the high tension network, the secondary winding of that transformer being connected to the moving coil of the loudspeaker that constitutes the translator R, reproducing the sonorous signals.

The connection P–P' is as mentioned above used for the reproduction of the word signals. If the signals that must be reproduced are telegraphic signals, the contactors Ce1 and Ce2 are put respectively in the positions T and T'. In this case, the signals, collected on the anode of the tube T3, are applied on the grid of the triode tube T4 to which the leakage resistance R20 is connected. The resistance R21 and the capacitor C17, mounted in parallel between the cathode *c*4 of the tube T4 and the ground constitute the cathodic polarization circuit. The anode *a*4 of the tube T4 is supplied from the point *c'* of the high tension network, through the primary of the transformer Tr1 that constitutes the loading impedance of that tube.

The signals collected on the anode *a*4 of the tube T4 are applied to the diode D1, by means of the secondary of the transformer Tr1. The resistance R24 and the condenser C18, associated with the diode D1 constitutes the detection circuit. When a signal of low frequency appears on the said anode *a*4 of the tube T4, the diode D1 conducts, and a signal of negative polarity appears on the junction point of the resistance R24 and the resistance R25. This signal of negative polarity is applied to the grid *g*6 of the tube T6 through R25 which is a protection resistance. The two triodes T6 and T7 constitute a trigger B of the type called Schmitt trigger.

The polarization of the tube T6 is regulated by the resistance R28, connected between the cathode *c*6 of the tube and the ground, and by the potentiometer chain constituted by the resistance R23 and the potentiometer R22 placed between the point *c'* of the high tension network and the ground. The sliding contact of the potentiometer R22 is connected to the junction point of the secondary of the transformer $Tr1$, of the resistance R24 and of the capacitor C18.

When a low frequency signal, retransmitted from the reader through the amplifier chain, described above makes a tension appear of negative polarity at the grid $g6$ of the tube T6, the latter is blocked. On that account, the tension, on the anode $a6$ of this tube, connected to the point $c'$ of the high tension network by means of the resistance R26, suddenly increases (no voltage drop produced in R26 owing to the fact that the anodic current is zero). This positive variation is retransmitted on the grid $g7$ of the tube T7, by means of the parallel circuit constituted by the capacitor C19 and the resistance R27. The tube T7 becomes conductive.

The cathodic polarization circuit of the tube T7 is the same as that of the tube T6. The grid leakage resistance R30 is connected between the grid $g7$ and the ground. The resistance R29, connected between the point $c'$ of the high tension network and the anode $a7$ of the tube T7 constitutes the loading resistance of that tube.

During the "white" manipulation, i.e., during the intervals separating the telegraphic signals, no signal is delivered by the diode D6. Consequently, the grid of the tube T6 goes to a positive potential, by means of the potentiometer chain constituted by R22 and R23. The result is that the tube T6 again becomes conductive. At this moment, the tension collected on the anode $a6$ of that tube suddenly decreases (because of the circulation of an important anodic current, bringing about a voltage drop at the terminals of the resistance R26). This negative variation of tension is retransmitted, by C19 and R27 in parallel, to the grid $g7$ of the tube T7. The latter is blocked.

By the foregoing one can deduce:

That, when reading a signal, the tube T6 is blocked, the tube T7 is conductive.

That, during the "white" manipulation, the tube T6 is conductive, the tube T7 is blocked.

That, the tube being blocked, the tension collected on the anode is maximum.

The trigger circuit constituted by the tubes T6 and T7 is used for the reproduction of reading signals or for having a signal during the "white" manipulation. The choice between the two possibilities is carried out by means of the reverser I1, connecting, either the anode of the tube T6 or the anode of the tube T7, to the potentiometer chain constituted by the resistance R33, the potentiometer R32, and the resistance R31 in series between the common point, of the reverser and the ground. The tension collected on the sliding contact of the potentiometer R32 is positive and maximum, when the tube (T6 or T7), to which the potentiometer chain is connected, is blocked.

The polarization of the tube T8, obtained by the resistance R36, connected between the cathode $c8$ and the point $c'$ of the high tension network, the resistance R34 connected between the grid $g8$ and the sliding contact of the potentiometer R32, and of the potentiometer chain described above, is regulated in order to block the tube, when the signal read on the tape is missing. A stabilizer tube T9 is connected between the cathode $c8$ of the tube T8 and the ground.

If the reverser I1 is put at the position S, in the reading of a signal recorded on the magnetic tape the tension on the anode $a6$ of the tube T6 then being maximum (because of the blocking of the latter tube) the tension of polarization at this moment transmitted to the grid $g8$ of the tube T8 is sufficient for releasing the latter. It can then transmit the low frequency oscillations supplied from the oscillator O, by means of the connecting capacitor C21. If on the contrary, the reverser I1 is put at the position B, the tube T8 can only transmit the low frequency oscillations from O, if the tube T7 is blocked, which happens during the "white" manipulation.

The low frequency oscillations transmitted and amplified by the tube T8 are collected at the terminals of the loading resistance R35, connected between the anode $a8$ and the point $c'$ of the high tension network, by means of the capacitor C20 whose other end is connected to the point T'. They are applied on the grid $g11$ of the tube T11 and consequently transferred to the loudspeaker R, as were the above mentioned word signals.

The oscillator O is constructed by a triode tube T10. The oscillating circuit is constituted by the self-induction coil 51 and by the capacitor C26 mounted in parallel. One of the ends of the circuit is connected to the anode $a10$ of the tube T10. This end is supplied through a part of the self-induction coil 51, from the point $c'$ of the high tension network. One can observe that the point $c'$ from which the tubes included in the chain T–T' are supplied, is connected to the common point of a reverser $Ce3$, forming one piece with the reversers $Ce1$ and $Ce2$, the position T'' corresponding to the switching on of the point $c'$ from the positive pole of the feeding source (+HT). The anodic feeding of the tube T10 is carried out by means of the resistance R40, bypassed in relation to earth by the capacitor C27 of high value.

The oscillations in the tube are sustained by the reaction, introduced by means of the coupling capacitor C25 connected between the grid $g10$ of the tube T10 and the end of the oscillating circuit. A grid leakage resistance R38 is connected between the grid $g10$ and the ground. The cathode $c10$ is connected to the ground, with the help of the polarization resistance R39.

The low frequency signal delivered by the oscillator O is transmitted to the grid $g8$ of the tube T8, by means of a voltage divider regulating the volume of the telegraphic signals diffused (control RVT); this divider is constituted by the capacitors C23 and C22 in series between the anode $a10$ and the ground, a potentiometer R37 being mounted in parallel on the capacitor C22 and the signals collected on the sliding contact of this potentiometer being applied to the grid $g8$ of the tube T8, by means of the junction capacitor C21.

FIGURE 3 represents in a schematic way the mechanism executing at a progressively variable speed the reading of the signals recorded on the magnetic tape.

The magnetic tape is mounted on the capstan *c*, driven by the plate $\rho$ by means of the transmission shaft *at*. The rotation of the plate is, in its turn, driven by the means of a sphere *se*, mounted at the end of the driving shaft *m*. Alternatively, the sphere may be driven independently as by belts B in FIG. 5. The distance between the centre of the plate *p* and the centre of the sphere can be modified with the help of a mechanism comprising a driving piece *pc* geared on an adjusting screw *vr*, mounted fixed in relation to the reading panel *pl*.

Moreover, the inclination of the motor in relation to the perpendicular at the plate *p* can be modified by means of the variable angle lever.

Let us assume that:

$wM$=the speed of the motor
$wP$=the speed of the plate
$a$=the inclination angle of the motor
$\rho$=the radius at the measuring point
$r$=the radius of the sphere One can prove that:

$$wP=\frac{wM\times r\sin a}{\rho}$$

As a matter of fact, one can write that the linear speed at the tangent point between the sphere *se* and the plate *p* is the same, on one hand, $wM\times r\sin a$ and on the other hand, $wP\times\rho$, then from $WP\times\rho=wM\times r\sin a$ and $$wP=\frac{wM\times r\sin a}{\rho}$$

The FIGURE 4 represents a variant of the reading mechanism at a progressively variable speed. (This mechanism is represented in a schematic way.)

It is constituted by two cones of the same angle, one for driving *ce*1, mounted on the driving shaft M, the other for receiving *ce*2, mounted on the capstan shaft *c* (driving) controlling the travel of the magnetic tape (not represented). The two cones are reversed and mounted so that the generators are parallel.

Between the two cones is mounted a movable satellite *sa*, driven by the cone *ce*1 and driving the cone *ce*2. This satellite is turning idly on its hub *my*. This hub can be moved longitudinally between the two cones on a screw *vs* driven by a setting nut. The maintenance of the setting is assured by bearings.

The speed of the satellite *sa* is a function of the diameter with which it is in contact with the cone *co*1. The satellite transmits its rotation motion to the cone *co*2 which forms one piece with the capstan, and the speed of this cone is a function of the diameter with which it is in contact with the satellite.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Record reproducing apparatus for signal records of either voice modulation or code modulation type, comprising adjustable-speed drive means for moving a signal record past a recording head, signal amplifying means having its input coupled to said head and having a signal output terminal, first and second signal processing channels adapted respectively to process amplified signals of code character and of voice character, and ganged switch means for selectively connecting said signal output terminal to the inputs of said two channels, and for concomitantly connecting the outputs of said channels selectively to a sound reproducer.

2. Apparatus in accordance with claim 1, in which said first signal processing channel includes a tone oscillator, a trigger circuit operable selectively to connect the output of said tone oscillator to the output of said first channel, and a detector for controlling said trigger circuit in accordance with the presence and absence of signals at said output terminal.

3. Apparatus in accordance with claim 2, including means for selectively inverting the control relationship between said detector and said trigger circuit, whereby to enable the production of tone output from said sound reproducer in response selectively to the presence, or the absence, of signal output at said signal output terminal.

References Cited by the Examiner

UNITED STATES PATENTS

| | | | |
|---|---|---|---|
| 148,066 | 3/1874 | Husbands | 74—193 |
| 1,448,490 | 3/1923 | Moakley | 74—198 |
| 2,300,038 | 10/1942 | Wright | 178—115 |
| 2,702,313 | 2/1955 | Andrews | 178—115 |
| 2,772,326 | 11/1956 | Hickey et al. | 178—115 |
| 2,881,251 | 4/1959 | Strip | 179—2 |
| 2,963,555 | 12/1960 | Brubaker | 179—100.2 |

FOREIGN PATENTS

| | | |
|---|---|---|
| 1,005,905 | 4/1952 | France. |
| 1,083,230 | 1/1955 | France. |

OTHER REFERENCES

Schematic of Heathkit Stereo Preamplifier, model SP–2, copyright 1958, Heath Company, Benton Harbor, Mich. (Copy in Group 240—179–100.2.)

BERNARD KONICK, *Primary Examiner.*

WALTER W. BURNS, JR., *Examiner.*

P. J. HIRSHKOP, J. R. GOUDEAU, M. S. GITTES, *Assistant Examiners.*